May 12, 1953 — F. W. GUIBERT — 2,638,008
ADJUSTABLE COMPENSATOR FOR REGISTERING METERS
Filed June 22, 1951 — 2 Sheets-Sheet 1
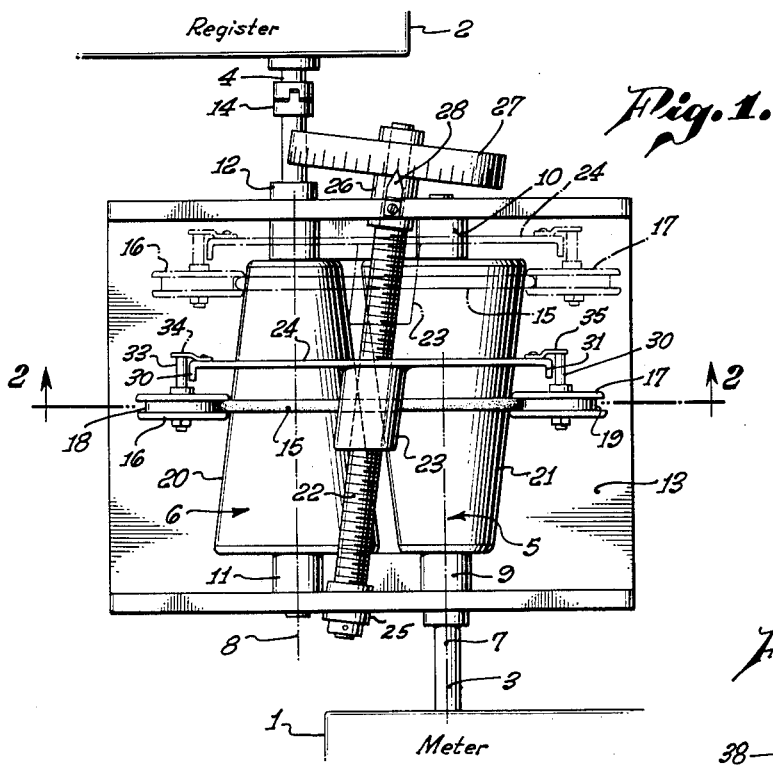
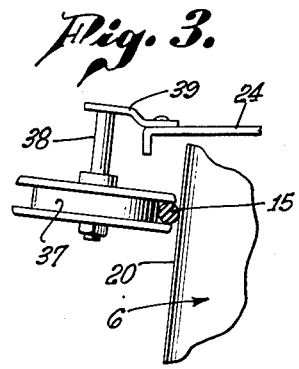
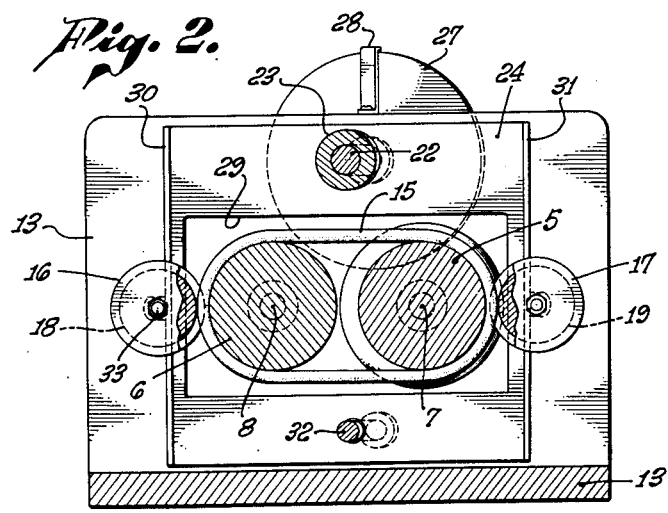
FRANCIS WALTER GUIBERT, INVENTOR.
BY John Flaw
ATTORNEY.

FRANCIS WALTER GUIBERT,
INVENTOR.

BY John Flam
ATTORNEY.

Patented May 12, 1953

2,638,008

UNITED STATES PATENT OFFICE 2,638,008

ADJUSTABLE COMPENSATOR FOR
REGISTERING METERS

Francis W. Guibert, Los Angeles, Calif.

Application June 22, 1951, Serial No. 233,036

7 Claims. (Cl. 74—242.3)

This invention relates to metering, and particularly to meters that are provided with indicating or recording registers.

Meters, such as those measuring the flow of electricity, gas, water, or the like, are now in extensive use. Although such meters are carefully designed to operate accurately, normally it is necessary to calibrate them, or to apply a correction factor.

It is one of the objects of this invention to make it possible readily to compensate for errors, so that the register or dial will indicate or record accurately.

It is another object of this invention to make it possible to adjust the correction factor in a simple and accurate manner.

In order to accomplish these results, there is interposed between the meter and the indicator or register an adjustable ratio motion transmitting device that can be set at any value within limits, say, from a ratio of .8 to a ratio of 2.0. These limits are ample to include any correction factor that might possibly be required for compensation.

Accordingly, it is another object of this invention to provide a simple and effective device of this character, preferably in the form of a cone and belt transmission, in which the position of the belt along the cones determines the ratio of transmission.

It is still another object of this invention to ensure that, in such transmitting mechanisms, the belt is prevented from being displaced along the conical surfaces after its position has been adjusted.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a plan view of an apparatus incorporating the invention;

Fig. 2 is a sectional view, taken along a plane corresponding to line 2—2 of Fig. 1;

Fig. 3 is an enlarged fragmentary plan view of a modified form of the invention;

Figure 4:
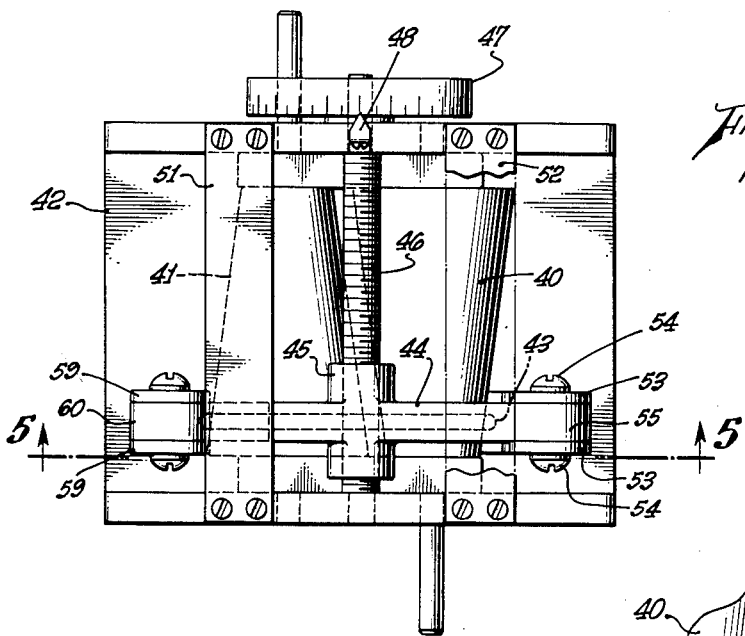
Fig. 4 is a plan view of a further modification of the invention.

In the form of the invention illustrated in Figs. 1 and 2, a meter 1 is shown as driving a register 2. This meter 1 may measure the flow of electricity, water, gas, or the like, and has a shaft 3 intended to operate the register 2.

Interposed between the meter and the register is a compensating device by the aid of which the ratio of transmission from the shaft 3 to the register shaft 4 may be adjusted within relatively narrow limits.

For this purpose, there are a pair of conical members 5 and 6 having parallel axes 7 and 8 of rotation. The conical surfaces of these members have the same slope. These conical members may be appropriately supported in antifriction bearing structures 9, 10, 11, and 12 supported in a frame 13. The conical member 5 may be directly connected to the shaft 3 of the meter, and the conical member 6 may be connected, as by a coupling member 14, to the shaft 4 of the register 2.

The conical members 5 and 6 are so arranged that the large end of the conical member 5 is adjacent the small end of the conical member 6.

A belt 15 of round cross section, and made of leather, rubber, or other flexible material, engages both conical surfaces. The belt 15 is shown, in this instance, as at intermediate position, in which the ratio of transmission from the member 5 to the member 6 is substantially unity. When the belt 15 is in the upper phantom-line position, the ratio of drive is greater than unity. Movement of the belt 15 upwardly, therefore, as viewed in Fig. 1, increases by infinite increments the ratio of transmission; and, similarly, the movement of the belt 15 downwardly decreases the ratio of transmission. By moving the belt 15 either up or down from the neutral position indicated, a compensation is effected corresponding to the ratio of transmission between the two conical members 5 and 6. To facilitate installation and removal of the belt 15, these members are rounded at the ends.

The belt shifting mechanism includes a pair of rollers 16 and 17 provided, respectively, with grooves 18 and 19. These grooves, as shown most clearly in Fig. 1, are arranged to contact the belt at the extreme outside elements 20 and 21 of the conical surfaces. Due to the parallelism of the axes 7 and 8, and to the uniformity of the slope, these outer elements are parallel to each other, but transverse to these axes.

Mechanism is provided for moving these rollers 16 and 17 in a direction parallel to these extreme outside elements. This is accomplished by the aid of a lead screw 22 which engages an internally threaded boss 23 mounted on a carriage 24. This carriage 24, as described hereinafter, resiliently supports the rollers 16 and 17.

The lead screw 22 is rotatably mounted in appropriate bearings 25 and 26 supported on the frame 13. It carries a calibrated wheel 27 cooperating with a stationary pointer 28 mounted on the frame 13. In this way, the adjustment of the carriage 24 may be accurately effected.

As shown most clearly in Fig. 2, the carriage 24 has an opening 29 to permit the passage of the conical members 5 and 6. Flanges 30 and 31 are formed at the opposite edges of this carriage. A guide post 32 extends between the arms of the frame 13 to guide the carriage 24 in its movement upon operation of the lead screw 22.

The grooved roller 16 is rotatably mounted upon a stationary pivot pin 33 attached, as by way of a flat spring 34, to the carriage 24. This flat spring 34 urges the roller 16 in a direction to engage the belt 15.

A similarly arranged spring 35 supports the pin 36 upon which the roller 17 is rotatably mounted.

Since the rollers 16 and 17 engage the belt 15 at the extreme outside elements of the conical surfaces, the belt 15 is effectively restrained against sliding upwardly and downwardly along the conical surfaces. In this way, the ratio of transmission is maintained at the desired preset value, as indicated by the pointer 28. Any deviation of the belt 15 at places where the rollers 16 and 17 do not engage the belt 15 has no effect upon the accuracy of this ratio, for it is at these engaging points where the drive actually occurs.

In the form shown in Fig. 3, the roller 37 is shown as pivotally mounted upon the pin 38, and as having an axis of rotation parallel with the extreme outside elements 20. A spring support 39, as before, urges the roller 37 to belt engaging position. In other respects, this form of the invention is similar to that illustrated in Figs. 1 and 2. It is understood, however, that the right-hand grooved roller is similarly mounted for free rotation on an axis parallel to the extreme outside element 21.

In the forms hereinbefore described, the movement of the belt shifter over the carriage 24 and the grooved rollers, such as 16 and 17, is in a direction parallel to the outside elements 20 and 21. In the form shown in Fig. 4, the movement of the belt shifter is in a direction parallel to the axes of rotation of the conical members.

Figure 6:
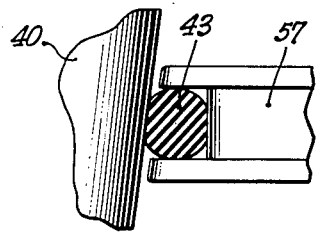
Fig. 6 is an enlarged fragmentary sectional view of a portion of the apparatus.
Figure 5:
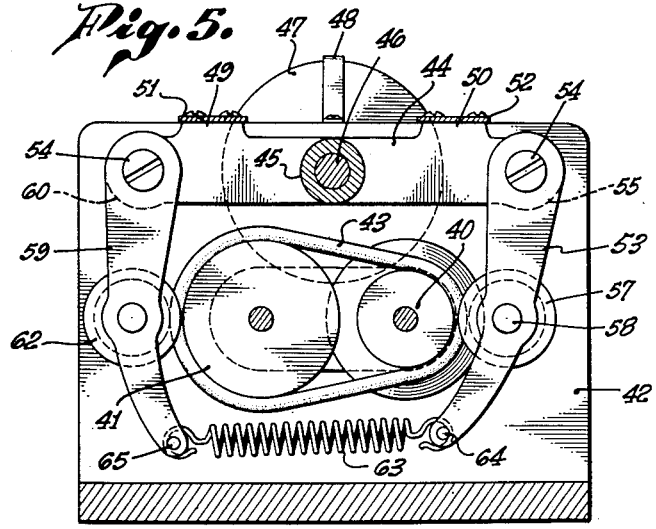
Fig. 5 is a sectional view, taken along a plane corresponding to line 5—5 of Fig. 4.

In the form shown in Figs. 4, 5, and 6, the conical members 40 and 41 are mounted for rotation in a frame 42, as by appropriate roller or ball bearings. The driving cone 40 may be connected, as before, to a meter, and the other cone member 41 may be connected to a register, or the like.

A round belt 43 engages the conical members 40 and 41.

Shifting of the belt 43 in this instance is accomplished by the aid of a carriage 44. This carriage 44 has a central boss 45 engaged by a lead screw 46. The axis of the lead screw is parallel with the axes of rotation of the members 40 and 41. The lead screw 46 is appropriately supported by bearings in the frame 42 and, as before, carries a calibrated wheel 47. This wheel 47 cooperates with a stationary pointer 48.

The carriage 44 which forms a support for the shifter is restrained against rotary movement by the aid of its bosses 49 and 50 that engage the lower surfaces of the cross strips 51 and 52.

At the right-hand side of the carriage 44, a pair of arms 53 are pivotally mounted on opposite sides of the ear 55, as by the bearing screws 54 passing through these ears. At an intermediate portion of the arms 53 there is a grooved roller 57 (see, also, Fig. 6) which is pivotally mounted on a pin 58.

A similar pair of arms 59 are mounted at the left-hand side of the carriage 44. They are pivotally mounted upon the ear 60 of carriage 44. A grooved roller 62, similar to grooved roller 57, engages the belt 43. The places of engagement, as shown most clearly in Fig. 5, are at the extreme outside elements of the conical members 40 and 41.

In this instance, the rollers 57 and 62 are urged toward belt engaging position by the aid of a tension spring 63 which is hooked over the pins 64 and 65 arranged at the lower extremities of the arms 53 and 59.

As the lead screw 46 is rotated, the arms 53 and 59 assume different angular positions. However, both the arms 53 and 59 are urged to belt engaging positions, and the belt 43 either rides up, as viewed in Fig. 4, or downwardly. In this way, the ratio of transmission between the driving conical member 40 and the driven conical member 41 may be adjusted to any extent between limits.

The inventor claims:

1. In a compensating device for meters of the indicating, recording, or registering type: a pair of cones having parallel axes of rotation, the large end of one cone being adjacent the small end of the other cone; a flexible belt engaging both cones; a belt shifter having a pair of rolling members, each member respectively engaging the belt substantially at the extreme outside elements of the cones; said belt shifter having provisions for resiliently urging the members to belt engaging position; and means for moving the belt shifter.

2. In a compensating device for meters of the indicating, recording, or registering type: a pair of cones having parallel axes of rotation, the large end of one cone being adjacent the small end of the other cone; a flexible belt having a round section engaging the cones; a belt shifter having a pair of grooved rollers, the grooves of which respectively engage the belt at the extreme outside elements of the cones; said belt shifter having provisions for resiliently urging the rollers to belt engaging position; and means for moving the belt shifter in a direction parallel to said elements.

3. In a compensating device for meters of the indicating, recording, or registering type: a pair of conical members having surfaces of the same slope; means for rotatably supporting said members on parallel axes so that the large end of one member is adjacent the small end of the other member; a flexible belt engaging the members; a belt shifter having a pair of grooves respectively engaging the belt substantially at the extreme outside elements of the conical surfaces; said belt shifter having provisions for resiliently urging the rollers to belt engaging position; and means for moving said shifter.

4. In a compensating device for meters of the indicating, recording, or registering type: a pair of conical members having surfaces of the same slope; means for rotatably supporting said members on parallel axes so that the large end of one member is adjacent the small end of the other member; a flexible belt of round cross section engaging the members; a belt shifter having a pair of grooved rollers respectively engaging the belt substantially at the extreme outside elements of the conical surfaces, the axes of the rollers being parallel to said elements; said belt shifter having provisions for resiliently urging the rollers to belt engaging position; and means for moving said shifter in a direction parallel to said elements.

5. In a compensating device for meters of the indicating, recording, or registering type: a pair of conical members having surfaces of the same slope; means for rotatably supporting said members on parallel axes so that the large end of one member is adjacent the small end of the other member; a flexible belt engaging the members; a carriage; a pair of arms pivotally mounted on the carriage on axes parallel to the axes of rotation of the members; means carried by the arms for respectively engaging the belt at substantially the extreme outside elements of the conical surfaces; means resiliently urging the arms respectively toward the corresponding member; and means for moving the carriage.

6. In a compensating device for meters of the indicating, recording, or registering type: a pair of conical members having surfaces of the same slope; means for rotatably supporting said members on parallel axes so that the large end of one member is adjacent the small end of the other member; a flexible belt of round cross section; a carriage; a pair of arms pivotally mounted on the carriage on axes parallel to the axes of rotation of the members; grooved rollers respectively carried by the arms for engaging the belt at substantially the extreme outside elements of the conical surfaces; means resiliently urging the arms respectively toward the corresponding member; and means for moving the carriage.

7. In a compensating device for meters of the indicating, recording, or registering type: a pair of conical members having surfaces of the same slope; means for rotatably supporting said members on parallel axes so that the large end of one member is adjacent the small end of the other member; a flexible belt of round cross section; a carriage; a pair of arms pivotally mounted on the carriage on axes parallel to the axes of rotation of the members; grooved rollers respectively carried by the arms for engaging the belt at substantially the extreme outside elements of the conical surfaces; a spring joining the arms to urge them toward each other; and means for moving the carriage.

FRANCIS W. GUIBERT.

References Cited in the file of this patent

UNITED STATES PATENTS

| Number | Name | Date |
|---|---|---|
| 594,622 | Harton | Nov. 30, 1897 |
| 1,063,410 | Bixby | June 3, 1913 |

FOREIGN PATENTS

| Number | Country | Date |
|---|---|---|
| 27,938 | Great Britain | 1912 |